US010625756B2

(12) United States Patent
Rackl et al.

(10) Patent No.: US 10,625,756 B2
(45) Date of Patent: Apr. 21, 2020

(54) WHEELSET GUIDE FOR A VEHICLE

(71) Applicant: Siemens AG Oesterreich, Vienna (AT)

(72) Inventors: Hugo Rackl, Stattegg (AT); Radovan Seifried, Maribor (SI)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 93 days.

(21) Appl. No.: 15/529,429

(22) PCT Filed: Oct. 13, 2015

(86) PCT No.: PCT/EP2015/073648
§ 371 (c)(1),
(2) Date: May 24, 2017

(87) PCT Pub. No.: WO2016/083009
PCT Pub. Date: Jun. 2, 2016

(65) Prior Publication Data
US 2017/0341662 A1    Nov. 30, 2017

(30) Foreign Application Priority Data

Nov. 27, 2014   (AT) .............................. A 50857/2014

(51) Int. Cl.
*B61F 3/16*      (2006.01)
*B61F 5/32*      (2006.01)
(Continued)

(52) U.S. Cl.
CPC ................ *B61F 5/325* (2013.01); *B61F 3/16* (2013.01); *B61F 5/305* (2013.01); *B61F 5/52* (2013.01);
(Continued)

(58) Field of Classification Search
CPC .. B61F 5/325; B61F 5/32; B61F 5/305; B61F 5/52; B61F 3/16
See application file for complete search history.

(56) References Cited

U.S. PATENT DOCUMENTS

| 4,597,337 A | * | 7/1986 | Willetts | .................. B60F 1/046 |
| | | | | 105/189 |
| 5,189,962 A | * | 3/1993 | Iwamura | .................... B61F 5/30 |
| | | | | 105/218.2 |

(Continued)

FOREIGN PATENT DOCUMENTS

| DE | 1146093 B | * | 3/1963 | .............. B61F 5/325 |
| DE | 1146093 B | | 3/1963 | |

(Continued)

*Primary Examiner* — Scott A Browne
(74) *Attorney, Agent, or Firm* — Cozen O'Connor

(57) ABSTRACT

A wheelset guide for a rail vehicle, which has a bogie frame, includes at least one longitudinal support, and includes a wheelset bearing for a wheelset of the rail vehicle, wherein the wheelset bearing is connected to the bogie frame and includes a rocker that is pivotably attached to the bogie frame via an elastic rocker bearing, and a pin guided by the rocker bearing, where the bogie frame forms a receptacle for the rocker bearing, which is configured such that the force is introduced into the bogie frame via the rocker bearing itself, and the rocker bearing is positioned in the receptacle in order to improve the strength and stability of the attachment of the rocker to the bogie frame or to the longitudinal support with an open profile.

19 Claims, 6 Drawing Sheets

(51) Int. Cl.
 *B61F 5/30* (2006.01)
 *B61F 5/52* (2006.01)
 *B60G 11/18* (2006.01)
 *F16F 1/02* (2006.01)
 *F16F 1/38* (2006.01)

(52) U.S. Cl.
 CPC ............ *B60G 11/181* (2013.01); *F16F 1/021* (2013.01); *F16F 1/38* (2013.01)

(56) References Cited

U.S. PATENT DOCUMENTS

2004/0231154 A1\* 11/2004 Wisniewski ......... B23D 31/003
 29/888.09
2011/0253004 A1\* 10/2011 Nishimura ............... B61F 5/325
 105/220

FOREIGN PATENT DOCUMENTS

| DE | 7121742 | U | 12/1971 | |
|---|---|---|---|---|
| DE | 2444887 | A | 3/1975 | |
| DE | 102013103827 | A1 | 10/2014 | |
| EP | 2557016 | A2 | 2/2013 | |
| FR | 923115 | A | 6/1943 | |
| FR | 923115 | A \* | 6/1947 | ............ B61F 5/325 |
| FR | 2543505 | A1 \* | 10/1984 | ............... B61F 5/32 |
| JP | S55167869 | U | 2/1980 | |

\* cited by examiner

FIG 1 -- PRIOR ART --

-- PRIOR ART --

WHEELSET GUIDE FOR A VEHICLE

CROSS-REFERENCE TO RELATED APPLICATIONS

This is a U.S. national stage of application No. PCT/EP2015/073648 filed 13 Oct. 2015. Priority is claimed on Austrian Application No. A50857/2014 filed Nov. 27, 2014, the content of which is incorporated herein by reference in its entirety.

BACKGROUND OF THE INVENTION

1. Field of the Invention

The invention relates to a wheelset guide for a rail vehicle, comprising a chassis frame of a bogie, having at least one longitudinal support, and a wheelset bearing for a wheelset of the rail vehicle, the wheelset bearing being connected to the chassis frame in a sprung manner via a spring element and having a rocker, where the rocker is pivotably attached to the chassis frame via an elastic rocker bearing and a pin which passes through said rocker bearing.

2. Description of the Related Art

Wheelset guides are known in the field of rail vehicles, while their object is to guide the wheelsets in a bogie in a functionally reliable manner. In one embodiment of a wheelset guide, the connecting rod guide takes the form of a rocker, also known as a rocker guide. In this structural format, a wheelset bearing is connected on one side to the chassis frame of the bogie via a spring element, such as a primary spring of the rail vehicle. On the other side, the wheelset bearing is connected to a rocker, which is in turn attached to the chassis frame via an elastic rocker bearing. By virtue of a rubber-sprung connection of the rocker to the chassis frame, the rocker guide can transmit vibrations as well as tractive and compressive forces.

In accordance with the prior art, at that end which is opposite to the wheelset, the rocker comprises an eye in which the rocker bearing is arranged. A pin passes through the rocker bearing, where the end region of the pin is held in a receptacle of the chassis frame to produce the connection between the wheelset bearing and the chassis frame. The receptacle on the chassis frame is usually configured as a pair of brackets, with these being arranged on either side of the rocker bearing on the underside of the chassis frame. As a result of this arrangement, the transfer of force into the chassis frame, via the rocker and via the brackets, occurs in front of or behind the rocker bearing itself as viewed in the direction of the wheelset axis. Therefore, the central region of the chassis frame, such as of a longitudinal support of the chassis frame, is not loaded and the force is instead transferred only into the lateral regions.

While such a layout does not give rise to any negative effects in the case of chassis frames or longitudinal supports having closed cross-sections, such as in the case of welded box beams, because the force is received directly by the side walls of the closed profile as a result of the lateral transfer into the lower flange, this embodiment has an extremely negative effect particularly in the case of chassis frames or longitudinal supports having open profiles, such as I-beams.

Owing to the transfer of force into the lateral regions of the lower flange, the lower flange must be strengthened to counteract a high bending stress that occurs because the vertical leg between upper flange and lower flange is arranged centrally relative to the direction of the wheelset axis, and the lateral regions offer a relatively low section modulus against bending. It a rocker of the type described above is attached to a chassis frame or a longitudinal support, then the vertical leg and the lower flange must have an opening in order to make space for the rocker and the rocker bearing, and this results in further disadvantages with regard to strength and stability, such as significant bending and gaps in rigidity.

SUMMARY OF THE INVENTION

In view of the foregoing, it is therefore an object of the invention to overcome the disadvantages of the prior art and to provide a wheelset guide which allows improved attachment, with respect to strength and stability, of the rocker to a chassis frame or longitudinal support having an open profile.

This and other objects and advantages are achieved in accordance with the invention by a wheelset guide for a rail vehicle, comprising a chassis frame of a bogie, having at least one longitudinal support, and a wheelset bearing for a wheelset of the rail vehicle, the wheelset bearing being connected to the chassis frame in a sprung manner via a spring element and having a rocker, where the rocker is pivotably attached to the chassis frame via an elastic rocker bearing and a pin which passes through the rocker bearing.

In accordance with the invention, the chassis frame forms a receptacle for the rocker bearing, where the receptacle is configured such that the transfer of force into the chassis frame occurs via the rocker bearing itself and such that the rocker bearing is positioned in the receptacle. As a result of transferring the force via the rocker bearing itself, the force is transferred into the chassis frame centrally, and therefore a favorable loading condition is established. The unfavorable transfer which occurs exclusively laterally of the rocker bearing is therefore excluded. Accordingly, the side profile of the chassis frame does not exhibit any significant bending or gaps in rigidity, thereby occasioning additional, advantages in relation to the overall weight and manufacturing costs of the chassis frame.

In an embodiment of the invention, the receptacle surrounds the rocker bearing at least partly in order to ensure an optimal attachment of the rocker bearing to the chassis frame and to enlarge a contact surface between receptacle and rocker bearing.

In accordance with a further embodiment of the wheelset guide in accordance with the invention, the receptacle is preferably configured as a cylindrical opening in the longitudinal support. The longitudinal support is that part of the chassis frame to which the rocker is usually connected. For the transfer of force directly via the rocker bearing in the central region of the longitudinal support, the configuration of the receptacle as an opening is particularly advantageous, because in this way tractive and compressive forces and vibrations in any direction can be optimally transferred into the longitudinal support via the rocker bearing held in the opening. The inner surface of the hole of the opening has all-over contact with the rocker bearing, in this case. The opening has a longitudinal axis that is advantageously oriented in parallel to the wheelset axis in this case.

Here, it is also feasible for the receptacle to comprise a tubular element that is integrated into the longitudinal support and whose axis runs parallel to the wheelset axis. In this case, the tubular element preferably extends over 90%, particularly preferably over 100%, of the dimension of the longitudinal support in the direction of the wheelset axis, where the inner diameter of the tubular element corresponds to the opening. In this case, the wall, thickness of the tubular element is normally greater than the thickness of the longitudinal support itself, such as greater than the thickness of the vertical leg of a longitudinal support having an I-shaped profile.

In particular, if the longitudinal support in a further embodiment has an I-shaped profile, then it is possible to achieve a wheelset guide having optimal strength by virtue of an inventive layout of the receptacle. In this case, the opening preferably cuts through the vertical leg of the I-profile without touching the lower flange. The lower flange itself is strengthened in the region of the opening relative to the dimensions in the rest of the longitudinal support.

In accordance with a preferred embodiment of the wheelset guide, the transfer of force into the longitudinal support occurs over at least one contact section of the contact surface between rocker bearing and receptacle. As a result of arranging the elastic rocker bearing in the receptacle which is formed as an opening in the longitudinal support, a contact surface is created between the inner surface of the receptacle and the circumference of the rocker bearing. A contact section of this contact surface can have a particular geometric shape in this case, in order to transmit the majority of the force. The entire circumferential surface of the rocker bearing is preferably configured as a contact section. It is then possible via this contact section to transfer the force centrally and directly into the longitudinal support according to the direction of the transfer of force, i.e., according to whether tractive or compressive forces or vibrations are transmitted. The direction of the force determines which region of the contact section is particularly stressed in this case, i.e., via which section of the circumferential surface of the rocker bearing the majority of the force is transferred into the longitudinal support.

In a further preferred embodiment of the invention, the elastic rocker bearing comprises a rubber-metal bush in order to configure the elastic rocker bearing in a robust and structurally simple manner. The rubber-metal bush consists of an inner sleeve through which the pin passes, an elastomeric layer surrounding the inner sleeve, preferably a rubber layer, and an outer sleeve that surrounds the elastomeric layer. In this way, any relative movement between the inner and outer sleeve is sprung or clamped by the intermediate elastomeric layer. It is also feasible to provide rubber-metal bushes without an inner sleeve in this case, where the pin is directly connected to the elastomeric layer in such an embodiment.

In accordance with the prior art, the flow of force occurs from the wheelset bearing via the rocker into the rocker bearing and from there via the pin to the external receptacle, usually brackets. The transfer of force into the longitudinal support via the brackets therefore occurs in lateral regions of the longitudinal support. As a result, this flow of force is not advantageous. In a further preferred embodiment of the wheelset guide in accordance with the invention, the flow of force therefore runs from the wheelset bearing into the chassis frame via the rocker, the pin and the rocker bearing. By virtue of the flow of force from the pin into the rocker bearing, the force that is to be transferred can be effectively centered, such that a central transfer into the chassis frame or longitudinal support is possible.

If the flow of force runs via the pin into the rocker bearing, the pin in a further preferred embodiment has a central section that is held in the rocker bearing and at least one end section for attaching to the rocker, where the transfer of force from the rocker into the pin occurs via the at least one end section of the pin and where the transfer of force from the pin into the rocker bearing occurs via the central section of the pin. It is thereby ensured in a structurally simple manner that the flow of force is concentrated in the rocker bearing, such that the transfer of force via the rocker bearing positioned in the receptacle occurs directly into the chassis frame.

In a particularly preferred embodiment of the invention, the rocker has a forked section for receiving two end sections of the pin in order to optimize the connection between the pin and rocker. Here, the forked section is configured such that, in this section, the rocker comprises two parallel contact elements that are separated from each other in the direction of the wheelset axis. Here, the contact elements each have a receiver for receiving the end sections of the pin, where the receiver can be configured as an opening or hole, for example.

In a further preferred embodiment of the wheelset guide, the end sections of the pin are connected to the forked section of the rocker in a torsionally rigid manner in order to improve the transmission of vibrations and forces or to fully utilize the clamping/sprung effect of the elastic rocker bearing. Such a connection can be produced, for example, if the end sections of the pin have a cross-section in the form of a segment of circle and a clamping element having a flat clamping section is fixed to the receiver, where the clamping element mates with the flat surface of the end section of the pin. As a result of the contact of the flat clamping section with the flat surface of the pin, relative movement between the pin and receiver is no longer possible.

The forked section of the rocker has two contact elements which are separated from each other and the rocker bearing is positioned in the receptacle on the chassis frame, preferably on the longitudinal support. As a result, a particularly space-saving connection of the rocker to the rocker bearing or to the pin that passes through the rocker bearing can be achieved if the contact elements of the forked end section surround the chassis frame or longitudinal support laterally, i.e., in front of and behind the receptacle as viewed in the direction of the wheelset axis, in the region of the rocker bearing. In a further embodiment of the invention, provision is therefore made for the forked end section of the rocker at least partly to laterally surround the chassis frame, preferably the longitudinal support.

In accordance with a further preferred embodiment of the invention, the rocker bearing is pressed or glued into place in the receptacle. Both assembled embodiments have specific advantages. For example, a frictional connection is produced in a simple manner by pressing in, while gluing into place prevents the formation of press-fit ridges.

In a further particularly preferred embodiment of the wheelset guide in accordance with the invention, the pin has a longitudinal axis and the wheelset bearing has a wheelset axis, where the longitudinal axis and the wheelset axis are oriented parallel to each other. The parallel orientation of the two axes allows a kinematically optimized interaction of the corresponding pivoting and sprung movements during operation.

In a bogie of a rail vehicle in which a primary spring is provided for the sprung connection between the chassis frame and wheelset bearing, a further embodiment of the invention provides for the spring element of the wheelset guide to be a primary spring of the rail vehicle.

In an operational wheelset guide in accordance with the invention, a wheelset is mounted in the wheelset bearing. The wheelset usually comprises two wheels and a wheel axle that connects the two wheels in a rigid manner. The wheels engage with the rails in this case.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In order to further explain the invention, reference is made in the following part of the description to the figures, from which further advantageous embodiments, details and developments of the invention can be derived. The figures are provided as examples and are intended to illustrate the character of the invention, but do not in any way restrict or even conclusively depict the character of the invention in which.

DETAILED DESCRIPTION OF THE EXEMPLARY EMBODIMENTS

Figure 1:
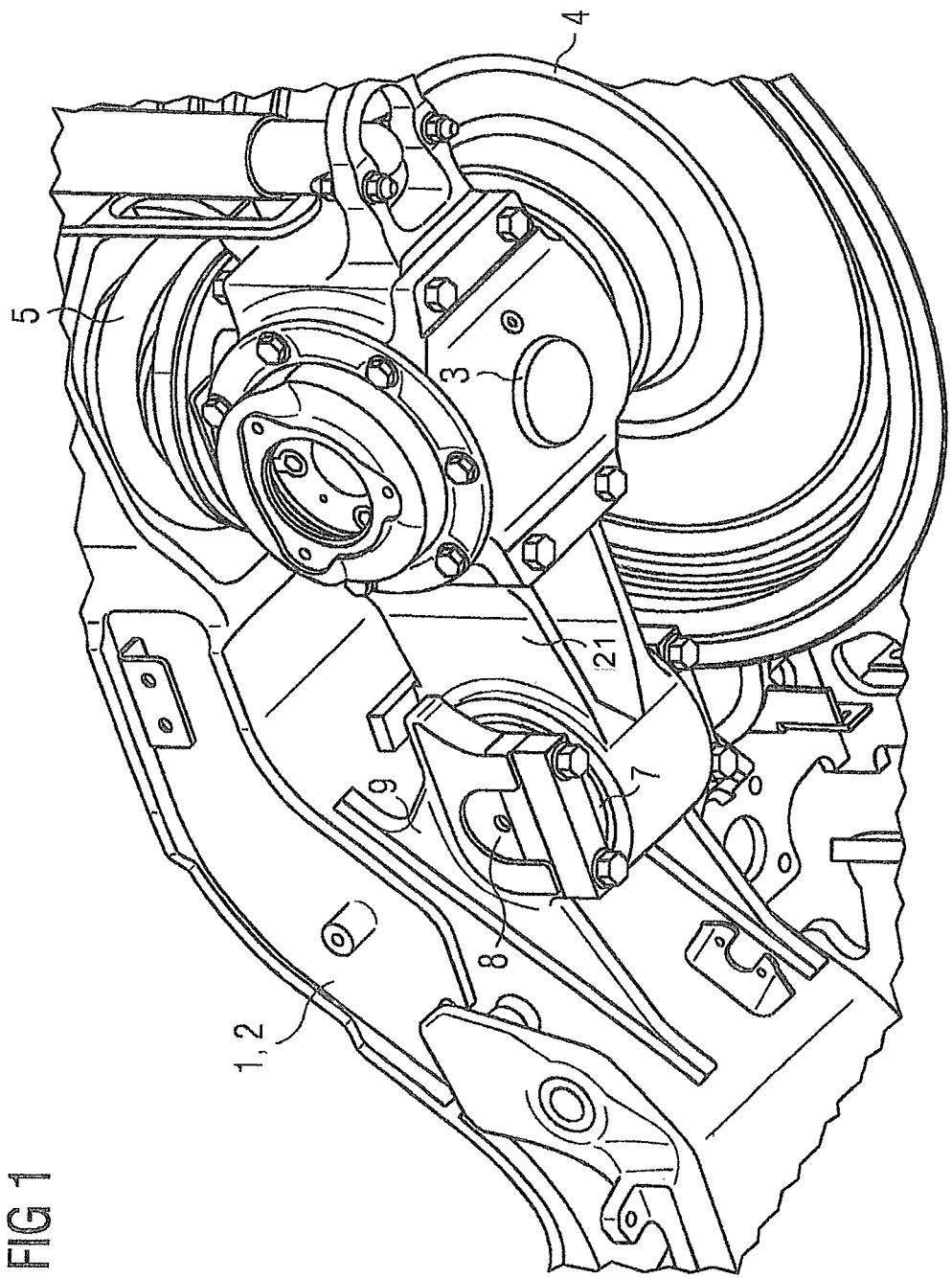
FIG. 1 shows an axonometric view of a wheelset guide in accordance with the prior art.

FIG. 1 shows a chassis frame 31, specifically a longitudinal support 2 of a chassis frame 31 having a box-type profile, with a wheelset guide in the structural format of a rocker guide according to the prior art. Here, the wheelset guide comprises a wheelset bearing 3, which is supported against the longitudinal support 32 via spring element 5 and carries a wheelset 4, where only one wheel of the wheelset 4 is depicted in this figure. The wheelset bearing 3 is also connected to a rocker 21, where at that end opposite to the wheelset bearing 3, the rocker 21 has an eye in which an elastic rocker bearing 7 is arranged. A pin 8 passes through the rocker bearing 7 and is connected to a receptacle 9, which is arranged on the longitudinal support 32 and takes the form of two brackets that are arranged in front of and behind the eye relative to a longitudinal axis 14 of the pin 8 (see FIGS. 4 and 5).

Figure 2:
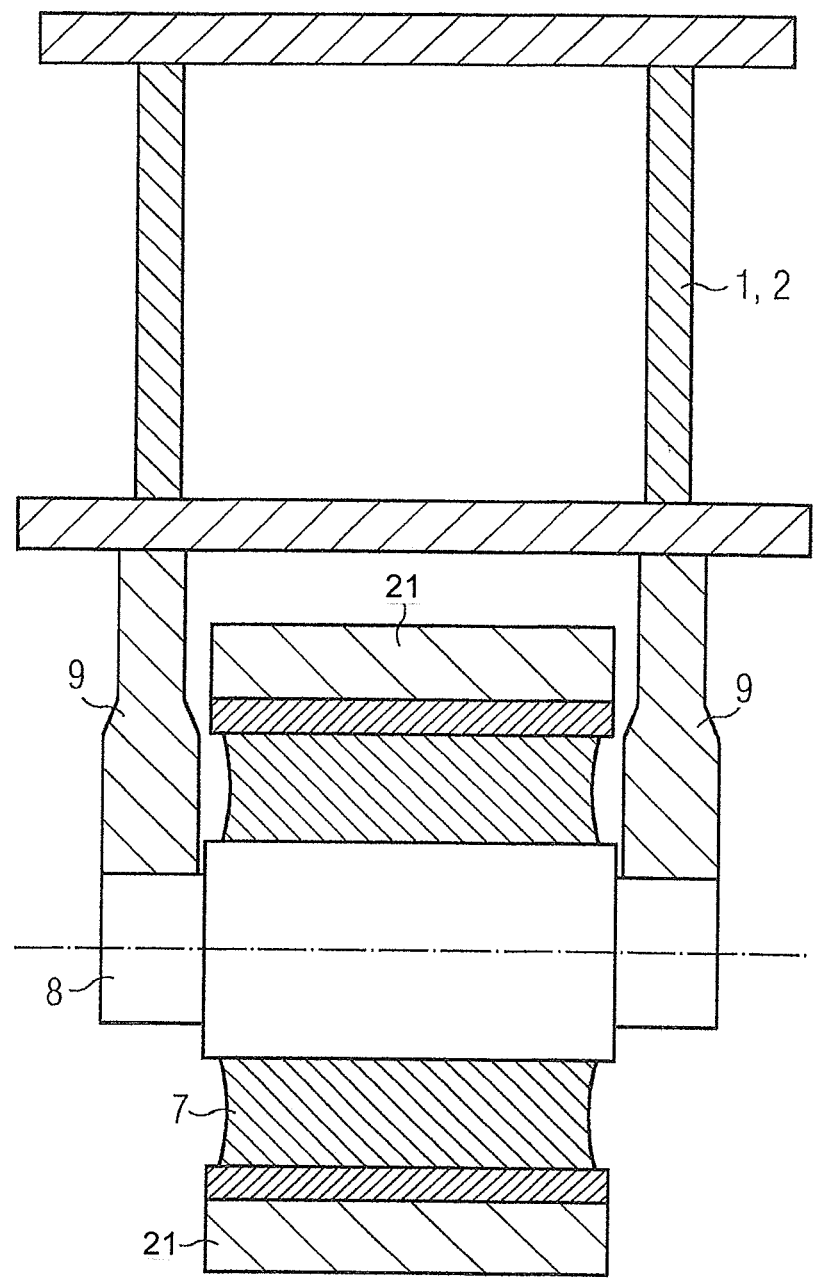
FIG. 2 shows a schematic sectional view of a rocker bearing in accordance with the prior art.

The section through the elastic rocker bearing 7 and the longitudinal support 32, as illustrated in FIG. 2, shows more clearly that the rocker bearing 7 is positioned in the eye of the rocker 21 and the transfer of force into the longitudinal support 32 having a box-profile cross-section occurs via the pin 8 and the receptacle 9 that is connected to the pin 8 and takes the form of two brackets. The force is therefore transferred largely into the lateral regions of the longitudinal support 32, where it is received by the side walls of the longitudinal support 32.

Figure 3:
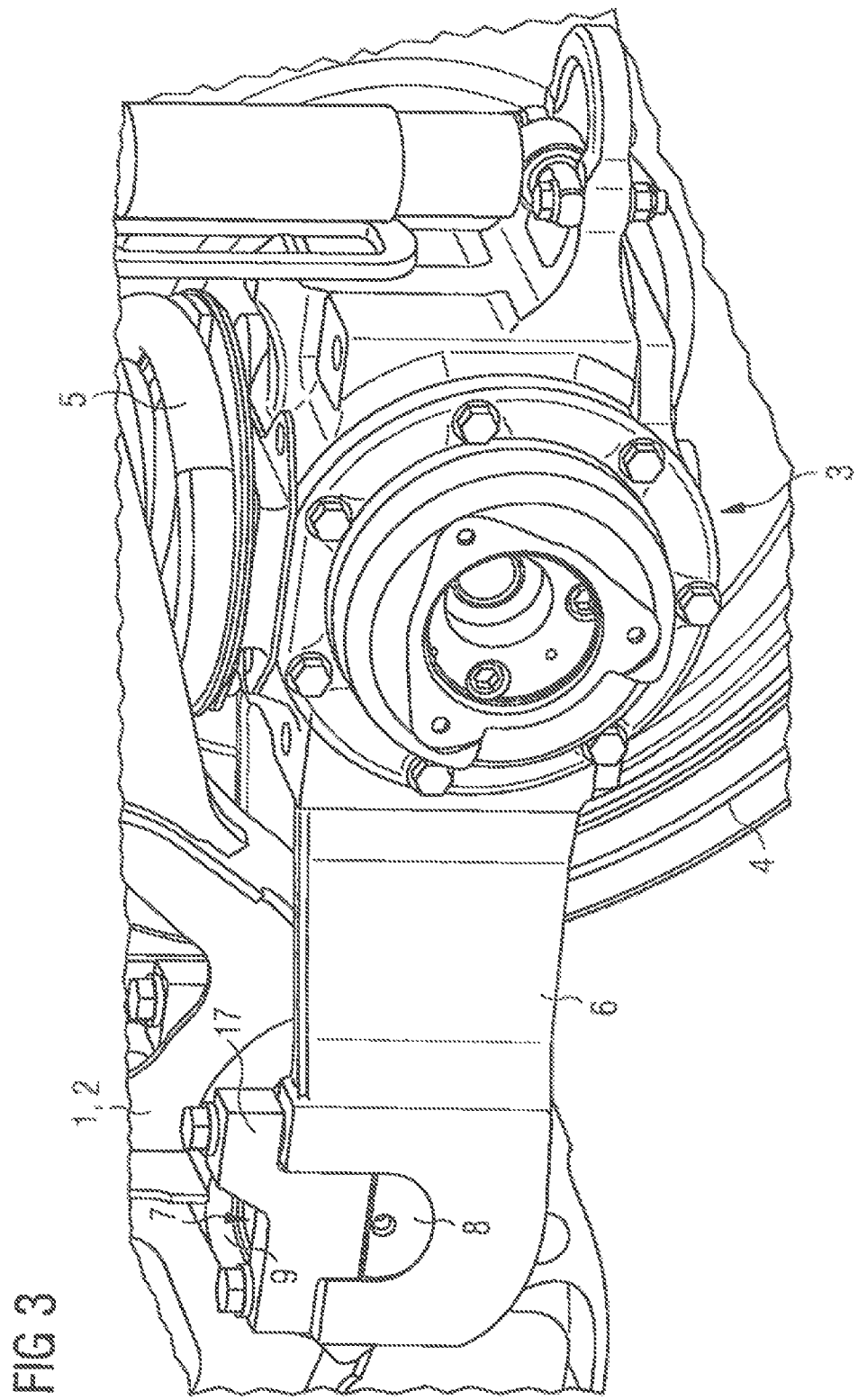
FIG. 3 shows an axonometric view of a wheelset guide in accordance with the invention.

FIG. 3 shows a wheelset guide in accordance with the invention. The fundamental structure corresponds largely to the prior art. The wheelset bearing 3 is connected on one side to the chassis frame 1 or longitudinal support 2 in a sprung manner by a spring element 5, and is attached on the other side to the longitudinal support 2 via the rocker 6 and the elastic rocker bearing 7. In this case, the spring element 5 is the primary spring of the rail vehicle. It can likewise be seen that a wheelset 4 is mounted in the wheelset bearing 3, where the wheelset 4 comprises two wheels and an axle that connects the wheels in a rigid manner, where only one of the wheels is visible.

Unlike the prior art, the longitudinal support 2 forms a receptacle 9 in the form of a preferably cylindrical opening, where the rocker bearing 7 is positioned in the receptacle 9. Here, the receptacle 9 is formed by a tubular element that is integrated into the longitudinal support 2. The opening is formed by the inner diameter of the tubular element, in this case. The connection of the rocker bearing 7 to the receptacle 9 is made by either pressing or gluing the rocker bearing 7 into the receptacle 9. The receptacle 9 completely surrounds the rocker bearing 7 in this case. As a result of the arrangement of the rocker bearing 7 in the receptacle 9, the transfer of force into the chassis frame 1 occurs through the rocker bearing 7 itself.

The pin 8 is passed through the rocker bearing 7 and is connected to the rocker 6 as described in detail below. In this way, the flow of force runs from the wheelset bearing 3 via the rocker 6, the pin 8, the rocker bearing and the receptacle 9 into the longitudinal support 2.

Figure 4:
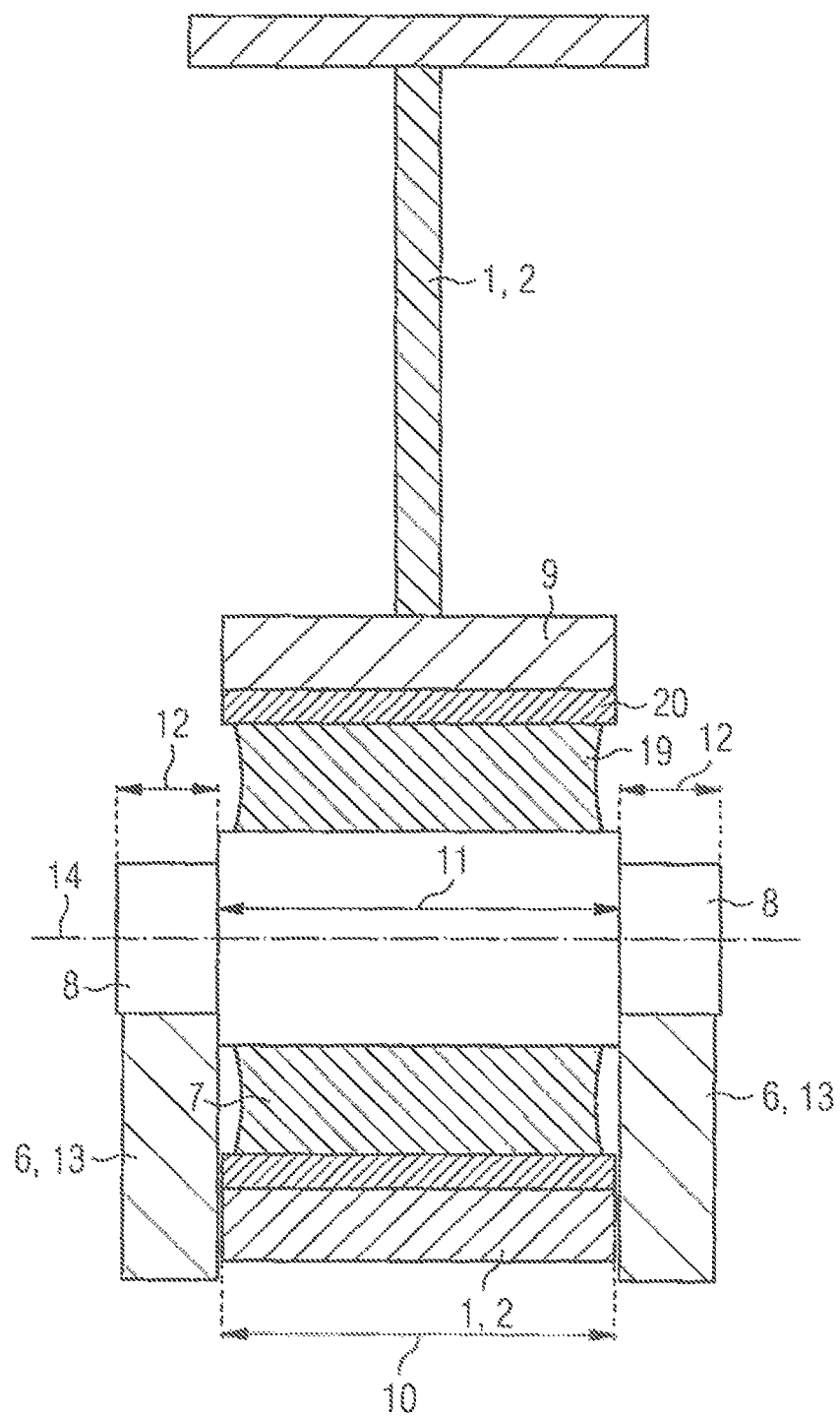
FIG. 4 shows a schematic sectional view of a rocker bearing in accordance with the invention.

A schematic sectional view through the chassis frame 1 or the longitudinal support 2 is again illustrated in FIG. This clearly shows both the I-shaped profile of the longitudinal support 2 and the receptacle 9 that is formed by the longitudinal support 2 and in which the rocker bearing 7 is arranged. The lower flange of the longitudinal support 2 in this schematic diagram coincides with the boundary of the receptacle 9, this being an exceptional case. The lower flange is not usually interrupted in the region of the receptacle 9, but is diverted tangentially past the receptacle 9 (see FIG. 6). FIG. 4 also shows the pin 8 has two end sections 12, these being arranged at the end of the pin 8 in each case. These end sections 12 are connected to the rocker 6, more precisely to a forked section 13 of the rocker 6, via which the transfer of force into the pin 8 takes place. The pin 8 also has a central section 11, which is held in the rocker bearing 7 and is arranged between the two end sections 12. The transfer of force from the pin 8 into the rocker bearing 7 occurs via this central section 11.

As illustrated, the rocker bearing 7 in this case can consist of an elastomeric layer 19 that is vulcanized or pressed onto the central section 11 of the pin 8. On its outer side, this elastomeric layer 19 is pressed into or vulcanized into a sleeve 20, where the sleeve 20 is mounted in the receptacle 9. Alternatively, a rubber-metal bush can be used as a rocker bearing 7, where the sleeve 20 corresponds to an outer sleeve and the elastomeric layer 19 is vulcanized between an inner sleeve and the outer sleeve, and where the inner sleeve is pressed onto the pin 8.

A contact surface is formed between the rocker bearing 7 or the sleeve 20 and the receptacle 9, where the contact surface corresponds in this case to the inner surface of the hole of the receptacle 9 which comprises a cylindrical opening. In this case, a contact section 10 corresponds to the contact surface itself. A different part of the rocker bearing 7 is subjected to a greater load depending on the direction of the force or vibration that is transferred.

Figure 5:
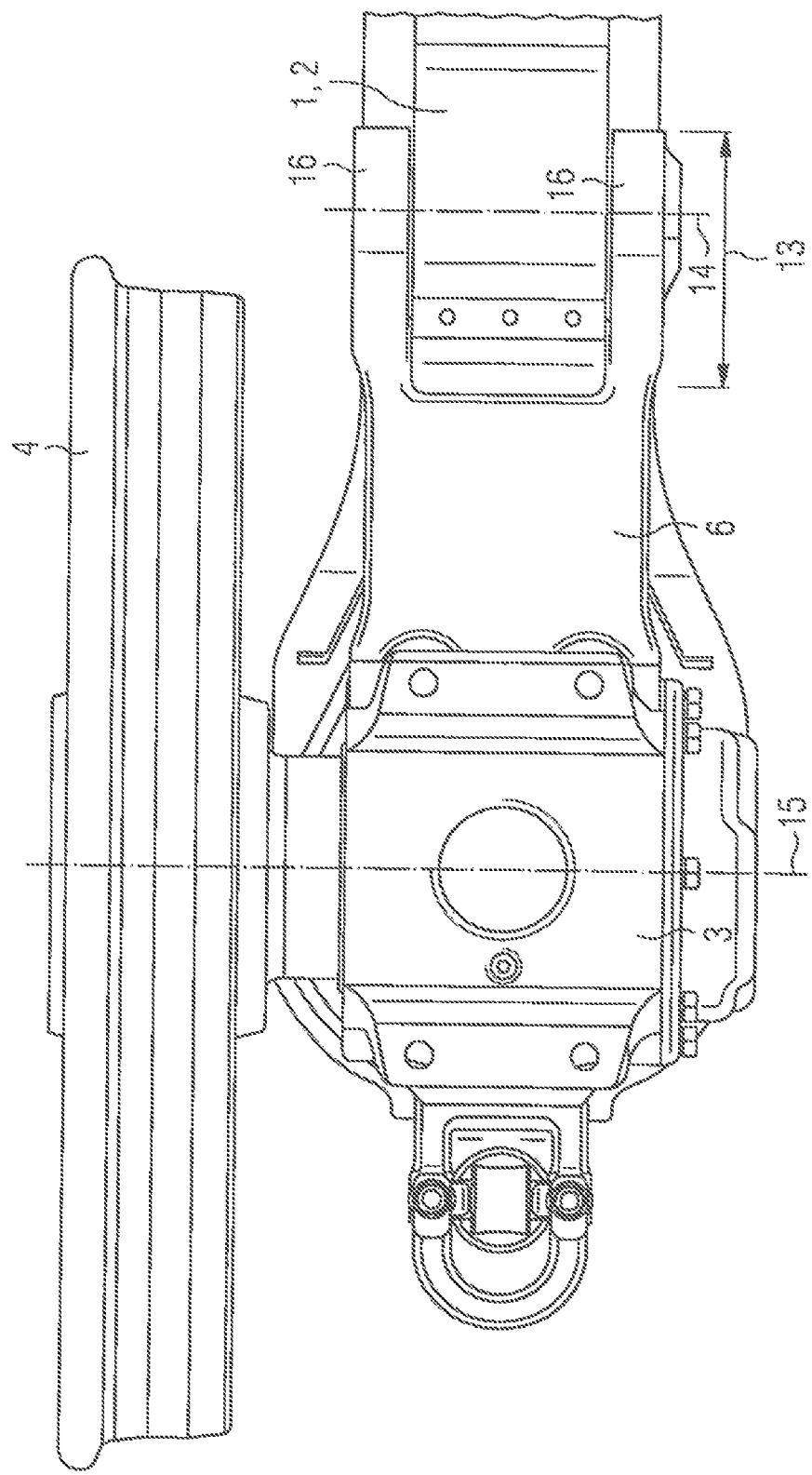
FIG. 5 shows a view from below of a wheelset guide in accordance with the invention.

FIG. 5 shows a view of a wheelset guide in accordance with the invention from below, i.e., from the direction of a rail. In particular, FIG. 5 shows the forked section 13 of the rocker 6, which forked section 13 is arranged at the opposite end of the rocker 6 to the wheelset bearing 3. This forked section 13 comprises two contact elements 16, which are arranged in parallel to each other and are separated from each other in the direction of the longitudinal axis 14 of the pin 8, such that the receptacle 9 of the longitudinal support 2 and the rocker bearing 7 that is mounted therein can be accommodated. In this way, the forked section 13 or the contact elements 16 surround the longitudinal support 2 laterally in the region of the receptacle 9. Here, the pin b and the wheelset bearing 3 are oriented such that the longitudinal axis 14 of the pin 8 and the wheelset axis 15 run parallel to each other.

Figure 6:
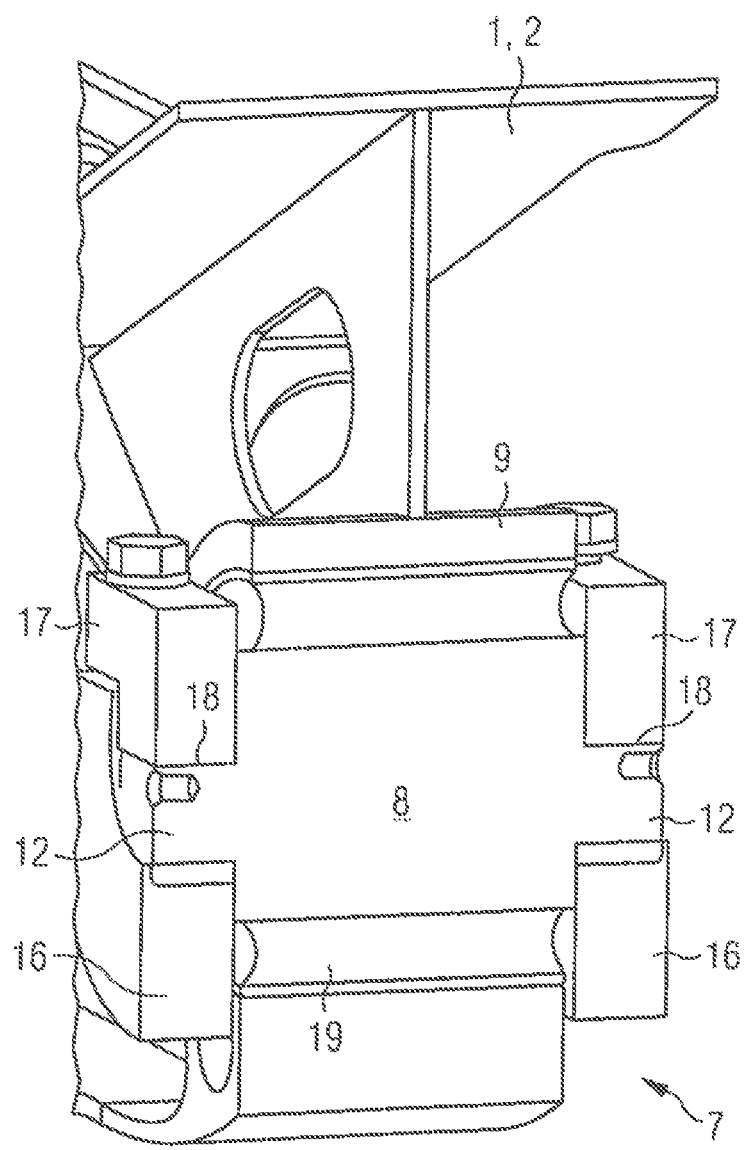
FIG. 6 shows a detailed sectional view of a rocker bearing in accordance with the invention in an axonometric view.

FIG. 6 shows a sectional view through a rocker bearing 7 as per the exemplary embodiment explained in FIGS. 3 and 5. The end sections 12 of the pin 8 project beyond the rocker bearing 7 along the longitudinal axis 14 on both sides, and are held by the contact elements 16 of the forked section 13 of the rocker 6. For this purpose, the contact elements 16 have a receiver in the form of an opening, in which each end section 12 of the pin 8 is held. In order to create a torsionally rigid connection between the pin 8 and the forked section 13, the end sections 12 of the pin 8 have a cross-section in the form of a circular segment. The opening at the contact elements 16 is configured in a semicircular manner and is limited on the opposite side by a clamping element 17 (see also FIG. 3). A clamping section 18 of the clamping element 17 mates with the flat surface of the end section 12, where the flat surface results from the cross-section in the form of a circular segment. The clamping element 17 is fixed to the contact element 16 using corresponding means, via two screw connections in the present exemplary embodiment.

It can also be seen from this figure that the lower flange of the longitudinal support 2 in the region of the receptacle 9 is routed directly past the receptacle 9, flowing into and out of the region tangentially. Therefore, the wall thickness of the receptacle 9 (or the receptacle 9 plus lower flange) in the region of the lower flange of the longitudinal support 2 is significantly greater than the wall thickness of the receptacle 9 on the opposite side of the pin 8. The wall thickness of the receptacle 9 (or the receptacle 9 plus lower flange) in the region of the lower flange of the longitudinal support 2 is also greater than the thickness of the upper flange of the longitudinal support 2.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form, or embodiment as a general matter of design choice. It is the intention, therefore, to be limited only as indicated by the scope of the claims appended hereto.

The invention claimed is:

1. A wheelset guide for a rail vehicle, comprising:
a chassis frame of a bogie and having at least one longitudinal support; and
a wheelset bearing for a wheelset of the rail vehicle and having a rocker with the outer side face, said wheelset bearing being connected to the chassis frame in a sprung manner via a spring element;
wherein the rocker of the wheelset bearing is pivotably attached to the chassis frame via an elastic rocker bearing encased by a sleeve, and via a pin which passes through said elastic rocker bearing, the pin having an outer side face substantially aligned with the outer side face of the rocker, the elastic rocker bearing extending substantially over an entirety of a central portion of the pin;
wherein the chassis frame forms a receptacle for the rocker bearing, said receptacle being configured such that a transfer of force into the chassis frame occurs via the rocker bearing itself and such that the rocker bearing is positioned in the receptacle.

2. The wheelset guide as claimed in claim 1, wherein the receptacle at least partly surrounds the rocker bearing.

3. The wheelset guide as claimed in claim 1, wherein the receptacle is configured as a cylindrical opening in the at least one longitudinal support.

4. The wheelset guide as claimed in claim 2, wherein the receptacle is configured as a cylindrical opening in the at least one longitudinal support.

5. The wheelset guide as claimed in claim 3, wherein the at least one longitudinal support has an I-shaped profile.

6. The wheelset guide as claimed in claim 3, wherein a transfer of force into the at least one longitudinal support occurs via at least one contact section of a contact surface between the elastic rocker bearing and the receptacle.

7. The wheelset guide as claimed in claim 5, wherein a transfer of force into the at least one longitudinal support occurs via at least one contact section of a contact surface between the elastic rocker bearing and the receptacle.

8. The wheelset guide as claimed in claim 1, wherein the elastic rocker bearing comprises a rubber-metal bush.

9. The wheelset guide as claimed in claim 1, wherein a flow of force from the wheelset bearing into the chassis frame runs via the rocker of the wheel set bearing, the pin, the elastic rocker bearing and the receptacle.

10. The wheelset guide as claimed in claim 9, wherein the pin has a central section which is held in the elastic rocker bearing and at least one end section for attachment to the rocker;
wherein a transfer of force from the rocker into the pin occurs via the at least one end section of the pin; and
wherein a transfer of force from the pin into the elastic rocker bearing occurs via the central section of the pin.

11. The wheelset guide as claimed in claim 1, wherein the rocker includes a forked section for receiving two end sections of the pin.

12. The wheelset guide as claimed in claim 11, wherein the end sections of the pin are connected to the forked section of the rocker in a torsionally rigid manner.

13. The wheelset guide as claimed in claim 11, wherein the forked section of the rocker laterally surrounds the chassis frame at least partly.

14. The wheelset guide as claimed in claim 12, wherein the forked section of the rocker laterally surrounds the longitudinal support at least partly.

15. The wheelset guide as claimed in claim 1, wherein the elastic rocker bearing is pressed into the receptacle.

16. The wheelset guide as claimed in claim 1, wherein the elastic rocker bearing is glued into the receptacle.

17. The wheelset guide as claimed in claim 1, wherein the pin has a longitudinal axis and the wheelset bearing has a wheelset axis, and wherein the longitudinal axis and the wheelset axis are arranged in parallel.

18. The wheelset guide as claimed in claim 1, wherein the spring element is a primary spring of the rail vehicle.

19. The wheelset guide as claimed in claim 1, wherein the wheelset is mounted in the wheelset bearing.

\* \* \* \* \*